(12) United States Patent
Kroeger

(10) Patent No.: US 12,187,557 B2
(45) Date of Patent: Jan. 7, 2025

(54) FOOD DISPENSING MACHINE AND ASSEMBLIES THEREOF

(71) Applicant: Gold Medal Products Co., Cincinnati, OH (US)

(72) Inventor: Todd M. Kroeger, West Chester, OH (US)

(73) Assignee: Gold Medal Products Co., Cincinnati, OH (US)

(\*) Notice: Subject to any disclaimer, the term of this patent is extended or adjusted under 35 U.S.C. 154(b) by 207 days.

(21) Appl. No.: 17/717,039

(22) Filed: Apr. 9, 2022

(65) Prior Publication Data

US 2022/0324662 A1 Oct. 13, 2022

Related U.S. Application Data

(63) Continuation of application No. 29/778,045, filed on Apr. 9, 2021, now Pat. No. Des. 976,629, and a continuation of application No. 29/778,044, filed on Apr. 9, 2021, now Pat. No. Des. 977,894.

(60) Provisional application No. 63/173,162, filed on Apr. 9, 2021, provisional application No. 63/173,163, filed on Apr. 9, 2021, provisional application No. 63/173,165, filed on Apr. 9, 2021.

(51) Int. Cl.
*B65G 65/46* (2006.01)
*A23L 7/187* (2016.01)

(52) U.S. Cl.
CPC .............. *B65G 65/46* (2013.01); *A23L 7/187* (2016.08); *A23V 2002/00* (2013.01)

(58) Field of Classification Search
CPC ...... B65G 65/46; A23L 7/187; A23V 2002/00
USPC .......................................................... 222/506
See application file for complete search history.

(56) References Cited

U.S. PATENT DOCUMENTS

| | | | |
|---|---|---|---|
| 1,819,660 A | 8/1931 | Stone | |
| 3,697,289 A * | 10/1972 | Day et al. | A23L 7/187 |
| | | | 99/323.11 |
| D229,867 S | 1/1974 | Shanks et al. | |
| 4,152,974 A * | 5/1979 | Tienor | A23L 7/183 |
| | | | 99/323.9 |
| 4,477,705 A | 10/1984 | Danley et al. | |
| D279,070 S | 6/1985 | Morrison et al. | |
| 5,069,923 A * | 12/1991 | Hubbard | A23L 25/20 |
| | | | 426/456 |
| D341,366 S | 11/1993 | Tricarico et al. | |
| 5,419,239 A * | 5/1995 | Covington | A47J 36/38 |
| | | | 219/400 |
| D363,944 S | 11/1995 | McCarter | |
| 6,123,011 A | 9/2000 | Cretors | |

(Continued)

OTHER PUBLICATIONS

Thomas, Shane; International Search Report and Written Opinion of the International Searching Authority issued in International Application No. PCT/US2022/023976; Sep. 22, 2022; 14 pages.

*Primary Examiner* — Vishal Pancholi

(74) *Attorney, Agent, or Firm* — Frost Brown Todd LLP

(57) ABSTRACT

A food dispensing machine includes a housing, a tray, an auger, and a motor. The housing defines an interior and includes a front wall that defines a dispensation opening adjacent to the interior. The tray is disposed in the interior and defines a trough that is disposed adjacent to the dispensation opening. The auger is disposed in the trough and is selectively rotatable about a rotational axis. The motor is operably coupled with the auger for powering rotation of the auger.

20 Claims, 10 Drawing Sheets

(56) References Cited

U.S. PATENT DOCUMENTS

| | | |
|---|---|---|
| D442,027 S | 5/2001 | Peters et al. |
| D590,490 S | 4/2009 | Lary |
| D637,636 S | 5/2011 | Liao |
| D663,992 S | 7/2012 | Kauer |
| D682,005 S | 5/2013 | Kauer |
| 8,770,184 B2 | 7/2014 | Schneider |
| 8,794,129 B2 | 8/2014 | Cretors |
| D715,842 S | 10/2014 | Smith |
| D734,794 S | 7/2015 | Doran |
| D849,961 S | 5/2019 | Muller et al. |
| D875,272 S | 2/2020 | Muller et al. |
| D875,273 S | 2/2020 | Muller et al. |
| D915,706 S | 4/2021 | Blackledge |
| D933,727 S | 10/2021 | Liao et al. |
| 2006/0288876 A1 | 12/2006 | Berger et al. |
| 2011/0274804 A1 | 11/2011 | Barrows et al. |

\* cited by examiner

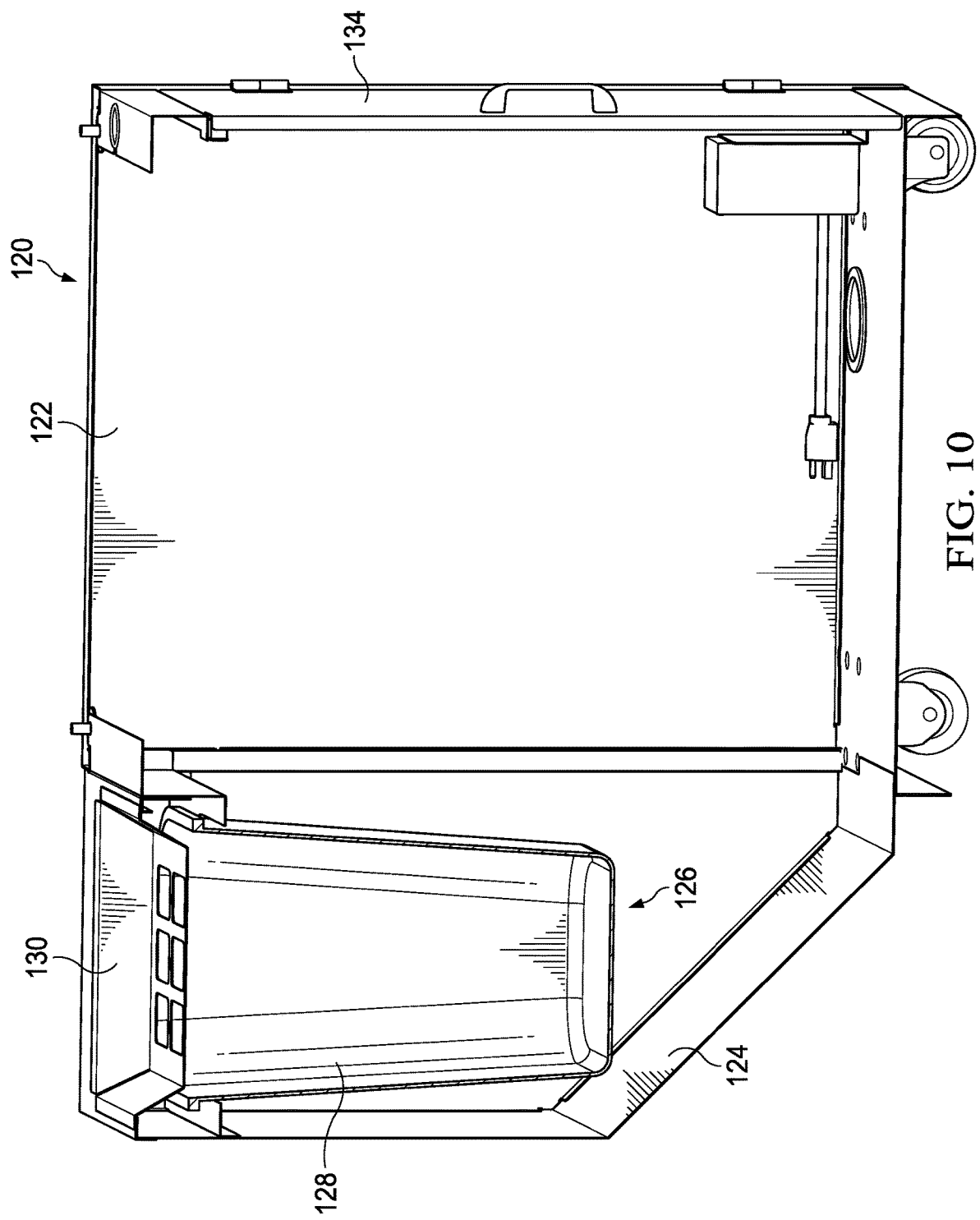

FOOD DISPENSING MACHINE AND ASSEMBLIES THEREOF

REFERENCE TO RELATED APPLICATIONS

This application claims priority of U.S. provisional patent application Ser. No. 63/173,162, entitled Auger and Auger System for Food Dispenser, filed Apr. 9, 2021, U.S. provisional patent application Ser. No. 63/173,163, entitled Retention Tray for Food Dispensing Machine, filed Apr. 9, 2021, U.S. provisional patent application Ser. No. 63/173,165, entitled Food Dispensing System, filed Apr. 9, 2021, and is a continuation of both U.S. design application Ser. No. 29/778,044, entitled Retention Tray Assembly for Food Dispensing Machine, filed Apr. 9, 2021 and U.S. design application Ser. No. 29/778,045, entitled Retention Tray Assembly for Food Dispensing Machine, filed Apr. 9, 2021, and hereby incorporates each of these patent applications by reference herein in their respective entireties.

TECHNICAL FIELD

Embodiments of the technology relate, in general, to systems, apparatuses and methods for food dispensers.

BACKGROUND

Food dispensers provide the benefit of food preparation and delivery from a clean environment. For example, a self-contained food preparation and dispensing apparatus like a popcorn machine can prepare the popcorn in an enclosed, clean environment for dispensing. However, the external surfaces of a food dispensing machine are susceptible to contact from customers. Minimizing customer contact with the external portions of the food dispensing machine around food delivery is beneficial.

BRIEF DESCRIPTION OF THE DRAWINGS

FIG. 10 is a cross sectional view taken along the line 10-10 of FIG. 9.

DETAILED DESCRIPTION

Figure 1:
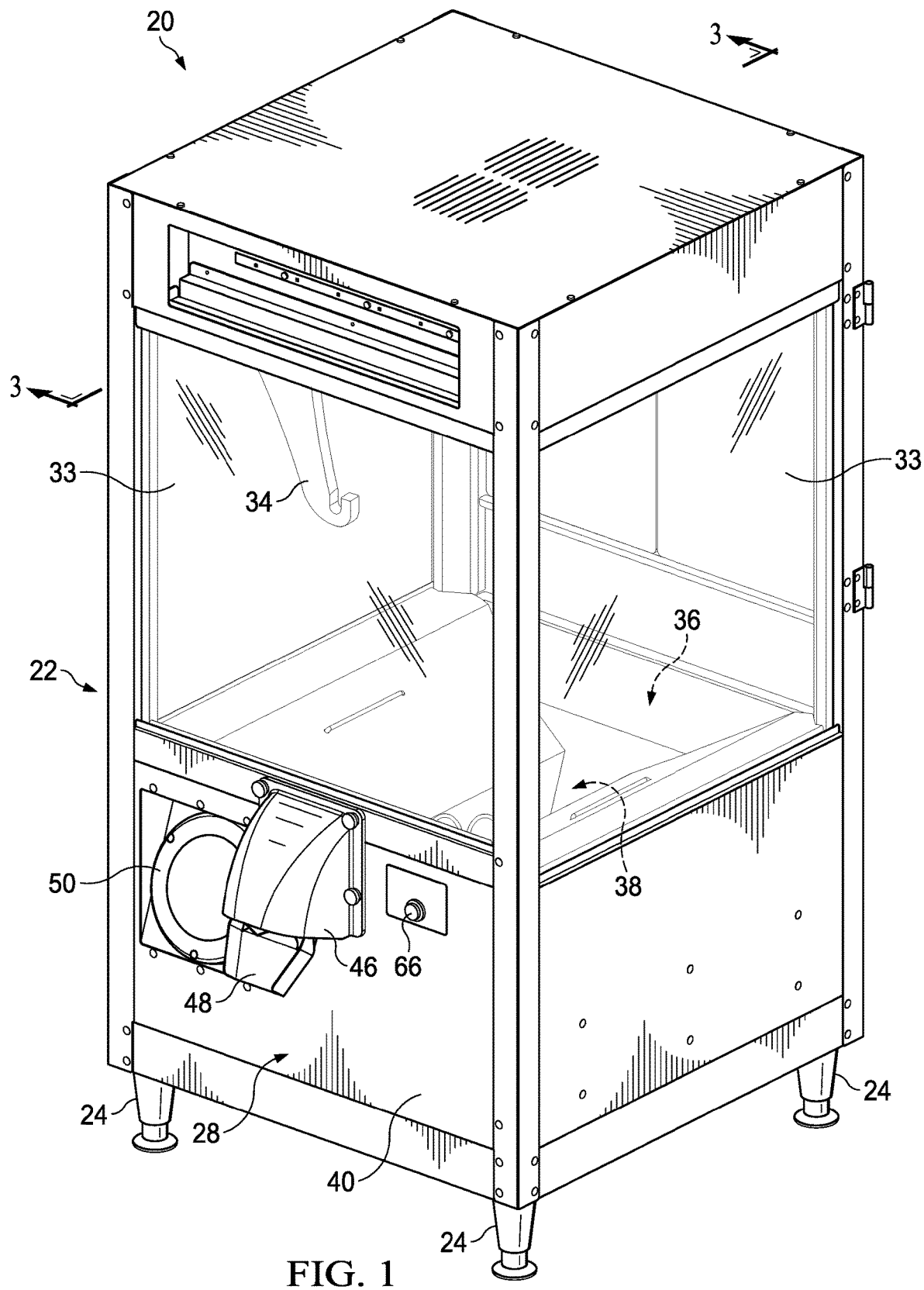
FIG. 1 is a front perspective view depicting a popcorn machine that includes a housing, windows, a tray and a hood.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Figure 2:
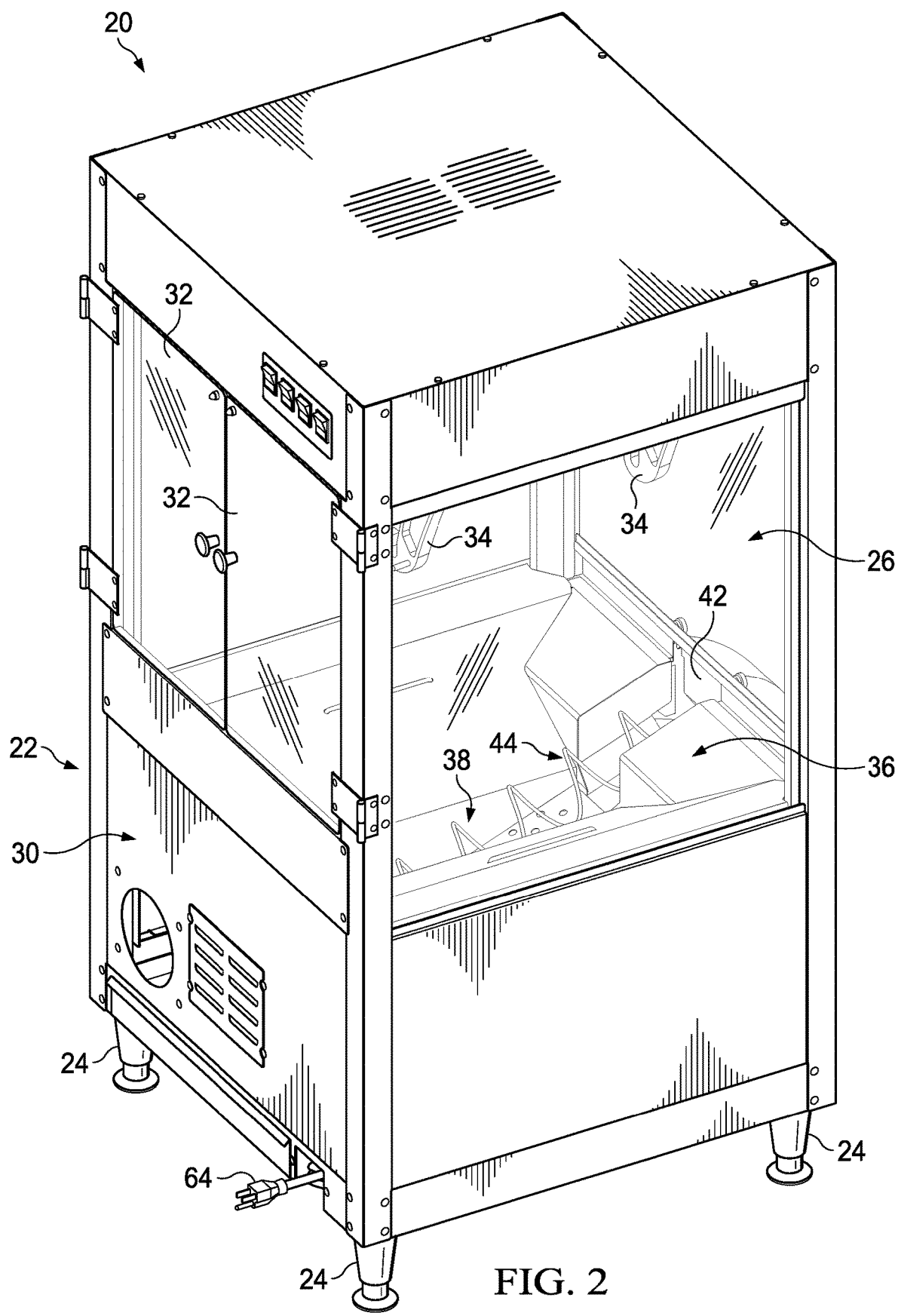
FIG. 2 is a rear perspective view of the popcorn machine of FIG. 1 depicting an auger in association with the tray but with the windows removed for clarity of illustration.

Embodiments are hereinafter described in detail in connection with the views and examples of FIGS. 1-10, wherein like numbers indicate the same or corresponding elements throughout the views. A popcorn dispensing machine (hereinafter "popcorn machine 20") that facilitates dispensation of popcorn to a consumer is generally depicted in FIGS. 1 and 2. The popcorn machine 20 can be a free-standing unit having a housing 22 that is supported by a plurality of legs 24 that can each be selectively adjustable for stable positioning on a counter, table top, or floor, for example. The housing 22 can define an interior 26 (FIG. 2) and can include a front side 28 (FIG. 1) and a rear side 30 (FIG. 2). As illustrated in FIG. 2, a pair of doors 32 can be disposed along the rear side 30 and can be selectively opened to gain access to the interior 26. A plurality of windows (e.g., 33 in FIG. 1) can be provided along the remaining sides of the housing 22 to allow for easy viewing into the interior 26. In an alternative embodiment, a pair of doors (e.g., 32) can be provided on any of the other sides of the housing (e.g., the front side 28) of the housing 22.

The popcorn machine 20 can include a kettle (not shown) that is suspended from a pair of hooks 34 and that produces popcorn within the interior 26. A tray 36 can be disposed within the interior 26 beneath the kettle and the hooks 34. When the kettle produces a batch of popcorn, the kettle can be pivoted on the hooks 34 to empty the popcorn onto the tray 36 below. The tray 36 can define a trough 38 that serves as a collection area for the popcorn. A front wall 40 of the housing 22 can define a dispensation opening 42 that is disposed adjacent to the trough 38. An auger 44 can be disposed in the trough 38 can be selectively rotated to dispense popcorn out of the dispensation opening 42 and to a consumer at the front of the popcorn machine 20.

As illustrated in FIG. 1, a hood 46 can be disposed over the dispensation opening 42 and a funnel 48 can be disposed beneath the dispensation opening 42. The hood 46 and the funnel 48 can cooperate to facilitate routing of the popcorn from the dispensation opening 42 into a cup or other container positioned beneath the dispensation opening 42. The popcorn machine 20 can include a cup dispenser 50 disposed along the front side 28 of the housing 22 that stores a stack of cups (not shown) or other stackable containers, like buckets, that can be individually retrieved by a consumer and filled with popcorn. It is to be appreciated that other suitable alternative or additional food containment options can be provided on the popcorn machine 20, such as, for example, a bag dispenser that dispenses a bag to a consumer to be filled with popcorn.

Figure 3:
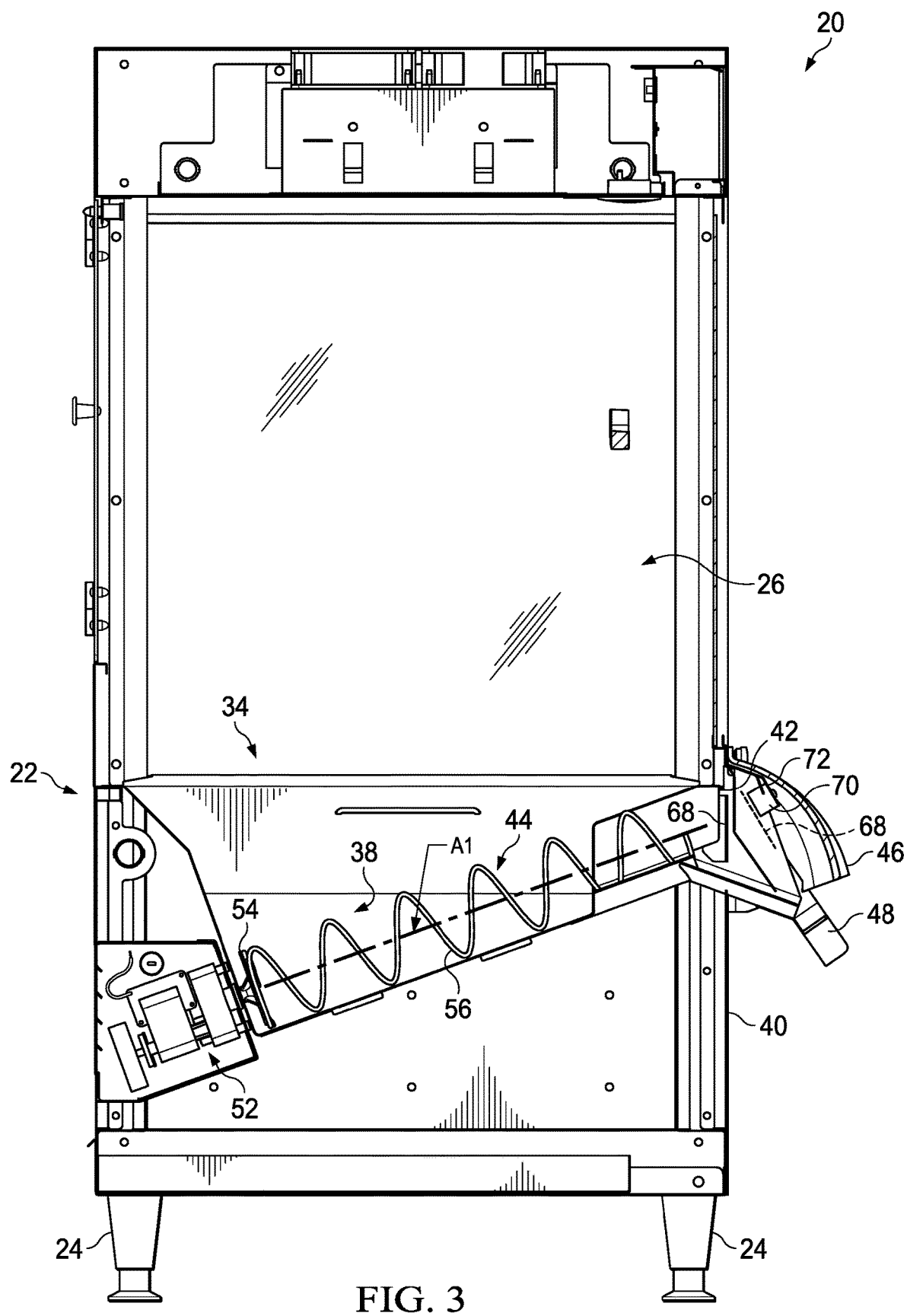
FIG. 3 is a cross sectional view taken along the line 3-3 of FIG. 1 depicting a motor in association with the auger of FIG. 2.
Figure 4:
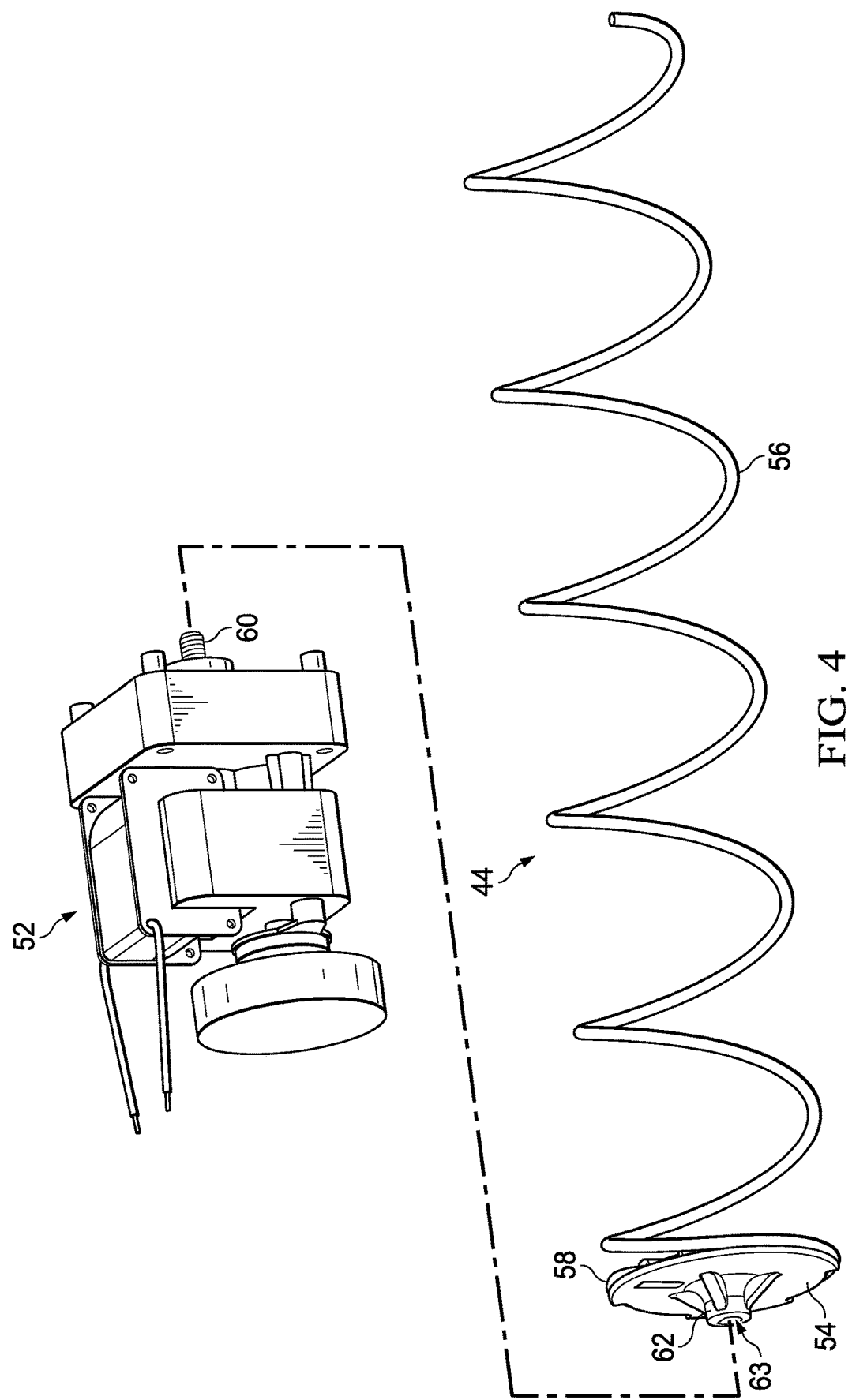
FIG. 4 is an exploded view of the motor and auger of FIG. 3.

Referring now to FIGS. 3 and 4, a motor 52 can be operably coupled with the auger 44 for powering the rotation of the auger 44 about a rotational axis A1 (FIG. 3). The auger 44 can include a coupling base 54 and a coil member 56. The coil member 56 can be coupled to the coupling base 54 with retention features 58 of the coupling base 54. In one embodiment, coupling base 54 can be formed of a thermoplastic and the coil member 56 can be formed of stainless steel, but it is to be appreciated that any of a variety of suitable materials are contemplated.

As illustrated in FIG. 4, the motor 52 can include a threaded driveshaft 60 that selectively rotates when the motor 52 is activated. The threaded driveshaft 60 can be threadably coupled with the auger 44 to facilitate rotation of the auger 44 in a dispensation direction (e.g., a rotational direction that facilitates dispensation of popcorn through the dispensation opening 42). The coupling base 54 of the auger 44 can have a collar 62 that defines a central opening 63 that is aligned with the rotational axis A1. The collar 62 can have internal threads that interface with the threaded driveshaft 60 to facilitate threaded coupling therebetween. As such, the auger 44 can be threaded onto the threaded driveshaft 60 to securely join the auger 44 to the threaded driveshaft 60 for operation together.

The direction of the complimentary threads (e.g., right handed or left handed) on the threaded driveshaft 60 and the collar 62 can be selected such that rotation of the threaded driveshaft 60 in the dispensation direction facilitates threading of the auger 44 onto the threaded driveshaft 60 to ensure that the auger 44 and the threaded driveshaft 60 remain coupled together during operation. In one embodiment, the complimentary threads can be right-handed and the threaded driveshaft 60 can rotate in a counter-clockwise dispensation direction (as viewed from the front wall 40). In another embodiment, the complimentary threads can be left-handed and the threaded driveshaft 60 can rotate in a clockwise dispensation direction (as viewed from the front wall 40). In this manner, the threaded driveshaft 60 can be rotated in a direction that effectively tightens the coupling base 54 onto the threaded driveshaft 60. The threaded interface between the coupling base 54 onto the threaded driveshaft 60 can prevent inadvertent decoupling of the coupling base 54 (and thus the auger 44) from the threaded driveshaft 60 during operation and can also allow the auger 44 to be easily removed (i.e., for cleaning) by simply rotating the auger 44 in an opposite direction as the dispensation direction. The threaded interface can accordingly provide a more dependable attachment between the coupling base 54 and the threaded driveshaft 60 that is easier to remove than conventional arrangements that utilize a shaped shaft (i.e., a D-shaped shaft) that is inserted into a complementary shaped opening on the coupling base. In one embodiment, the motor 52 can be an electric motor (e.g., an AC or DC motor) that only rotates in one direction (e.g., a one-way motor), but other motors are contemplated. Power for the motor 52 (and other electrical components) can be provided from a power cord 64 that can be plugged into a suitable power source, such as a wall outlet.

The motor 52 can be selectively actuated via a pushbutton 66 (FIG. 1) that is located on the front wall 40 of the housing 22. When a consumer wants popcorn from the popcorn machine, the consumer can select a cup from the cup dispenser 50 and can position the cup beneath the hood 46 and funnel 48. The consumer can press the pushbutton 66 to start rotation of the auger 44 (via the motor 52) to dispense popcorn from the dispensation opening 42 into the cup. When a desired amount of popcorn has been dispensed into the cup, the consumer can release the pushbutton 66 which can stop the auger 44 and the motor 52 and thus the popcorn from being dispensed from the popcorn machine 20. The rotational speed of the motor 52 (and thus the auger 44) can be tailored to accommodate for different serving sizes and/or food products. In one embodiment, the motor 52 can be associated with a gearbox (not shown) that has a gear ratio that achieves a desired motor speed. In another embodiment, the motor 52 can be a DC variable speed motor that can be tuned to a desired motor speed.

Figure 5:
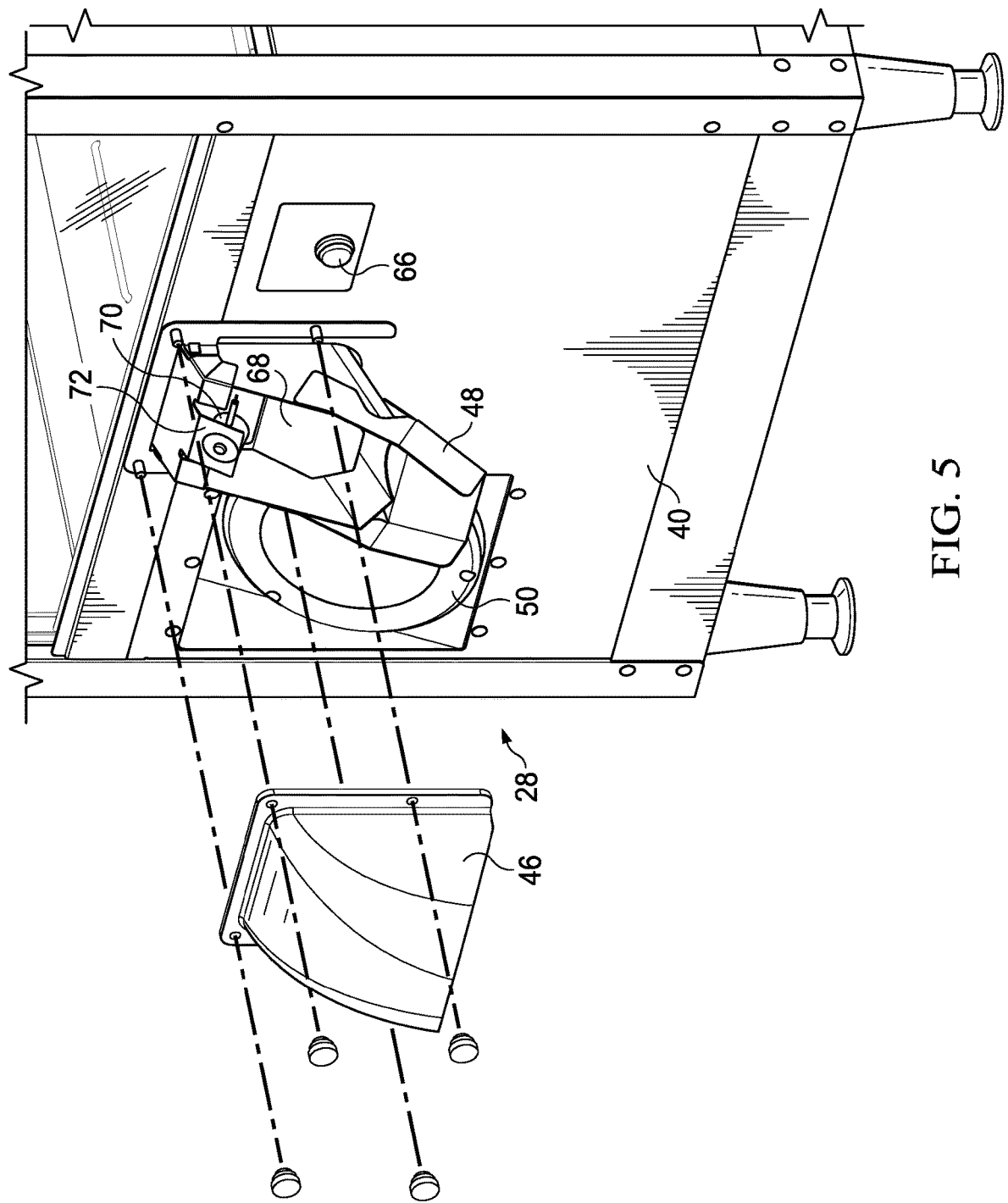
FIG. 5 is an enlarged perspective view of the popcorn machine of FIG. 1 but with the hood shown in an exploded view.

Referring now to FIGS. 3 and 5, a door 68 can be pivotally coupled to the front wall 40 above the dispensation opening 42 and selectively pivotable between a closed position (shown in solid lines in FIG. 3) and an opened position (shown in dashed lines in FIG. 3). When the door 68 is in the closed position, it can substantially cover the dispensation opening 42 to prevent popcorn from being dispensed therefrom. When the door 68 is in the opened position, it can be pivoted away from the dispensation opening 42 to allow popcorn to be dispensed therefrom. When the auger 44 is at rest, the door 68 can be provided in the closed position. When the auger 44 operates, the popcorn that is fed from the auger 44 through the dispensation opening 42 can urge the door 68 into the opened position to allow the popcorn to be dispensed therefrom.

The door 68 can be biased into the closed position under its own weight/mass. The weight of the door 68 can be selected based on the weight of the product (i.e., type of popcorn) that is being dispensed. The heavier the product, the heavier the door 68 can be to maintain a proper flow of product while also being able to move to the closed position when the auger 44 stops (i.e., to limit waste and prevent unauthorized access to the product). In one embodiment, the door 68 is biased in a closed position, for example by a spring (not shown, but can be any of known springs, such as a torsion spring, suitable for biasing a hinged door in a closed position). In one embodiment, the door 68 can be affixed to the popcorn machine 20 by a spring hinge (not shown) utilizing a torsion spring. As the popcorn advances due to the rotation of the auger 44, the force of the advancing popcorn overcomes the biasing spring force to cause the door 68 to move to the opened position.

Still referring to FIGS. 3 and 5, an electromagnet 70 can be positioned above the door 68 and inside of the hood 46. The electromagnet 70 can be coupled to a flange 72 that extends above the door and is angled at substantially the same angle as the door 68 when in the opened position. The door 68 can be formed of a material that is attracted to the electromagnet 70 (e.g., a ferritic material). When the door 68 is in the opened position, the electromagnet 70 can contact the door 68 and can be selectively activated to hold the door 68 in the opened position. When the electromagnet 70 is deactivated, the door 68 is free to return to the closed position. In one embodiment, the electromagnet 70 can be electrically coupled with the pushbutton 66 and selectively activated when the pushbutton 66 is depressed. As such, when the auger 44 is actuated via the pushbutton 66 to dispense popcorn, the door 68 can be urged open and can be magnetically attracted to the electromagnet 70 which can hold the door 68 in the opened position to allow the popcorn to be dispensed more consistently than conventional gravity-type door arrangements. When the pushbutton 66 is released, the auger 44 can stop dispensing popcorn and the electromagnet 70 can be deactivated to release the door 68 into the closed position.

One example method of operation of the popcorn machine 20 will now be described. When a customer pushes the pushbutton 66, the motor 52 can be energized to rotate the auger 44 and the electromagnet 70 can also be energized. Popcorn is urged by the auger 44 toward the door 68. The advancing popcorn pushes the door 68 open, causing it to pivot into the opened position until the door 68 is sufficiently attracted to the electromagnet 70 to remain affixed to the electromagnet 70. The customer can position a cup under the hood 46 to collect the popcorn from the funnel 48. At any time, the customer can release the pushbutton 66, thereby stopping the rotation of the auger 44 and de-energizing the electromagnet 70. The flow of popcorn out of the popcorn machine 20 then stops and the door 68 is released and returns to a closed position.

Figure 6:
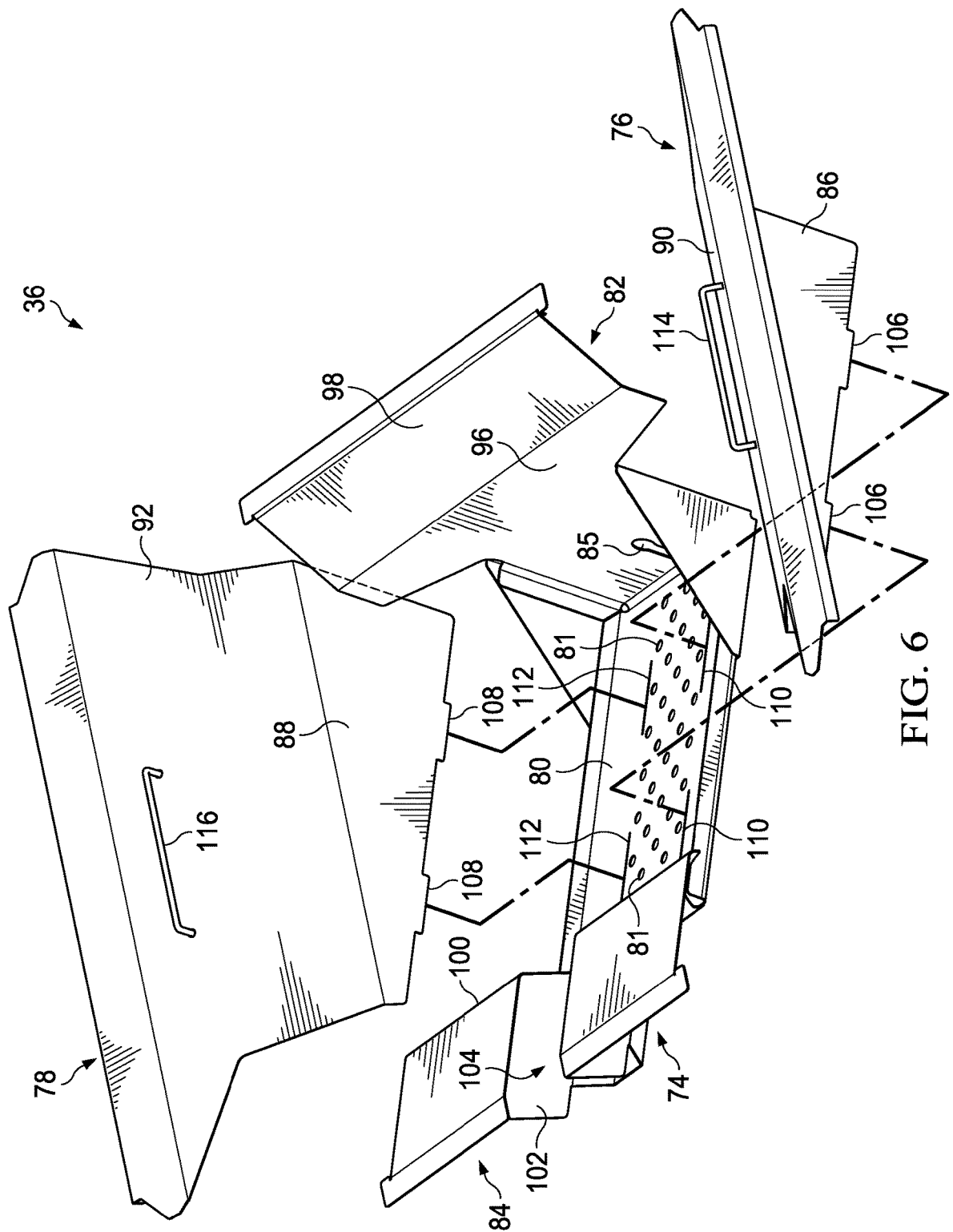
FIG. 6 is an exploded view of the tray depicted in FIG. 1.
Figure 7:
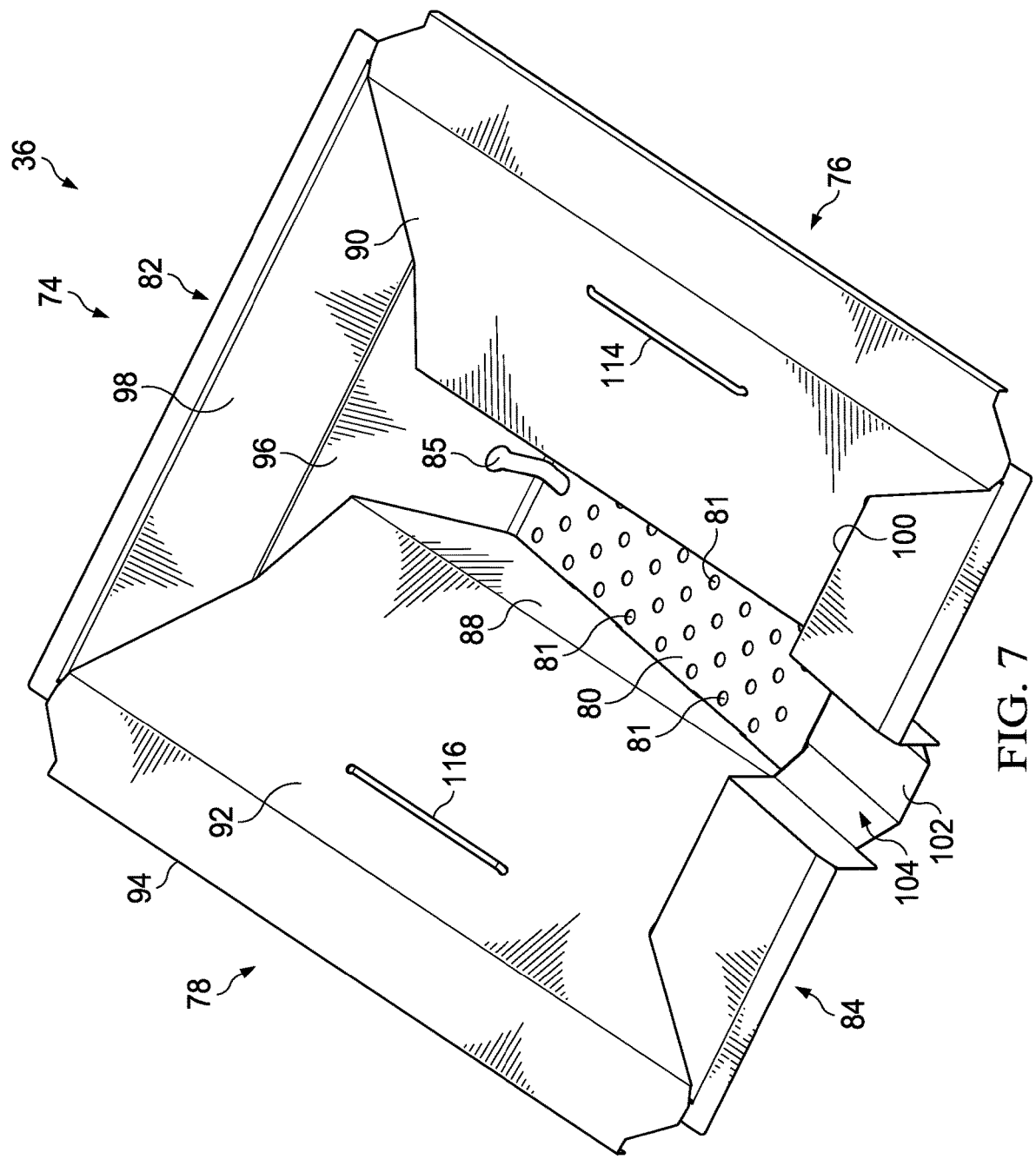
FIG. 7 is an assembled front perspective view of the tray depicted in FIG. 1.
Figure 8:
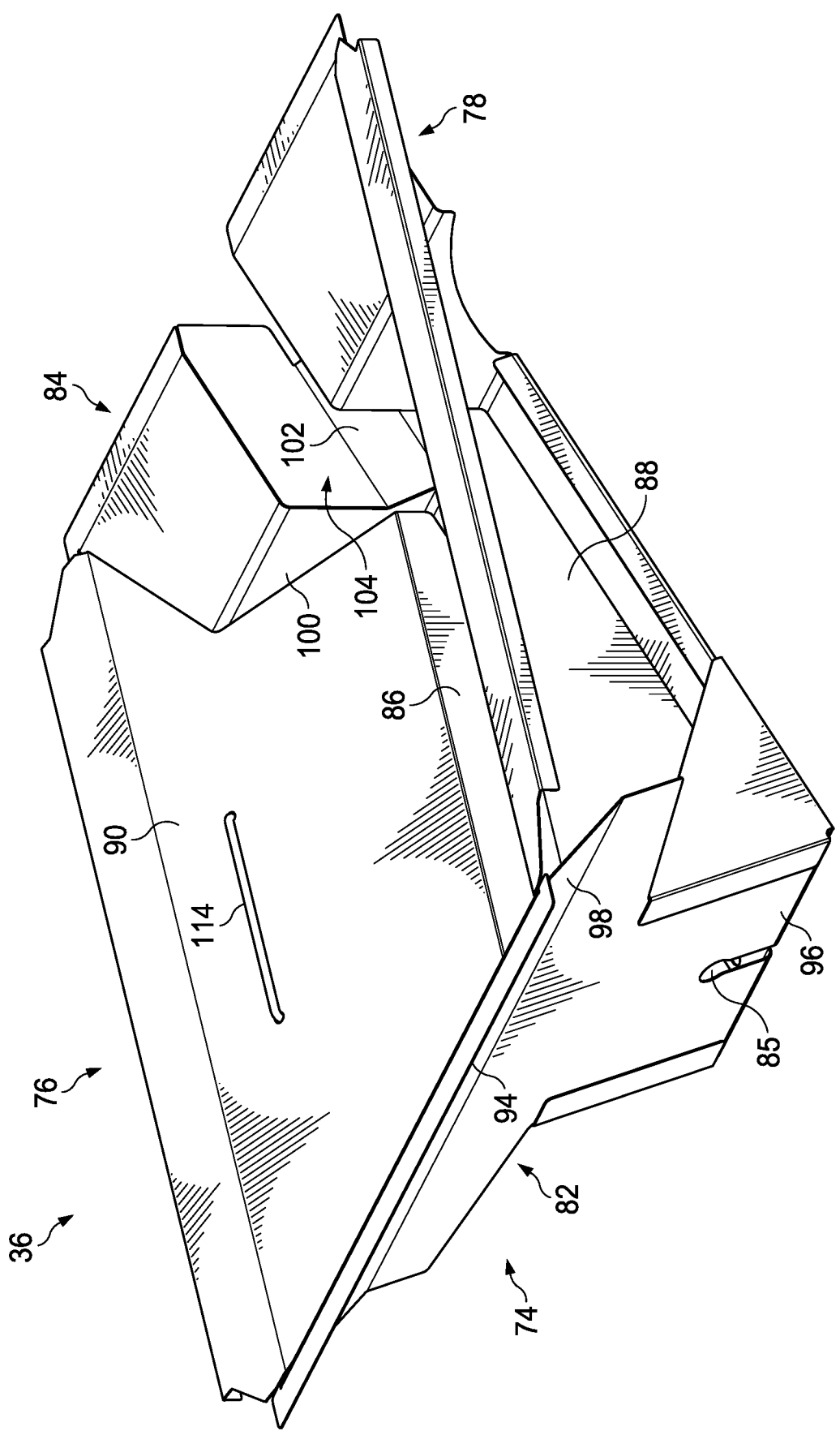
FIG. 8 is an assembled rear perspective view of the tray depicted in FIG. 1.

Referring now to FIGS. 6-8, the tray 36 is shown to include a main structure 74, a right side panel 76, and a left side panel 78. As illustrated in FIG. 6, the main structure 74 can include a floor 80, a rear panel 82, and a front panel 84. The rear panel 82 and the front panel 84 can extend upwardly from the floor 80 and can be spaced from each other such that the floor 80 extends between the rear panel 82 and the front panel 84. The floor 80 can define a plurality of openings 81 that are sized and configured to filter out unpopped kernels, transfer heat (when the popcorn machine 20 is equipped with an underlying heating element), and/or drain excess fluid (e.g., oil) from the popcorn. In one embodiment, the openings 81 can have a circular cross section and a diameter of about 10 mm. The floor 80 and the rear panel 82 can cooperate to define a slot 85 that is configured to accommodate the threaded driveshaft 60. In one embodiment, each of the floor 80, the rear panel 82, and the front panel 84 can be formed together as a one piece construction, such as, for example, from an individual sheet of material (e.g., stainless steel) that is bent or shaped into the floor 80, the rear panel 82, and the front panel 84.

The right side panel 76 and the left side panel 78 can extend from the main structure 74 and can be spaced from each other such that the right side panel 76 and the left side panel 78 cooperate with the floor 80, the rear panel 82, and the front panel 84 to define a collection area for the popcorn dispensed from the kettle (not shown). The right side panel 76 and the left side panel 78 can include a right lower wall 86 and a left lower wall 88, respectively, that each interface with the floor 80, the rear panel 82, and the front panel 84 to define the trough 38. A right upper wall 90 and a left upper wall 92 can extend from the right lower wall 86 and the left lower wall 88, respectively. The right upper wall 90 and the left upper wall 92 can each extend towards an outer edge 94 of the tray 36 and can be sloped towards the trough 38. The right upper wall 90 and the left upper wall 92 can accordingly cooperate to funnel popcorn towards the right lower wall 86 and the left lower wall 88 and into the trough 38. In one embodiment, the right upper wall 90 and the left upper wall 92 can be angled with respect to the right lower wall 86 and the left lower wall 88, respectively, by between about 30 degrees and 60 degrees.

The rear panel 82 can include a lower wall 96 and an upper wall 98 that extends from the lower wall 96. The lower wall 96 can interface with the floor 80 and the right and left lower walls 86, 88 to define a portion of the trough 38. The upper wall 98 can extend towards the outer edge 94 of the tray 36 and can be sloped towards the trough 38 to facilitate funneling of popcorn towards the trough 38. In one embodiment, the upper wall 98 can be angled with respect to the lower wall 96 by between about 30 degrees and 60 degrees.

The front panel 84 can include a front wall 100 that cooperates with a u-shaped floor 102 to define a channel 104 adjacent to the trough 38. The channel 104 can be disposed between the dispensation opening 42 and the trough 38 to facilitate the passage of popcorn over the front wall 100 to the dispensation opening 42.

Referring again to FIG. 6, the tray 36 is shown dissembled with the right and left side panels 76, 78 separated from the main structure 74. The right side panel 76 can include a pair of right tabs 106 that extends from the right lower wall 86. The left side panel 78 can include a pair of left tabs 108 that extends from the left lower wall 88. The floor 80 can define a pair of right slots 110 and left slots 112 that correspond with the pair of right tabs 106 and the pair of left tabs 108, respectively. When the tray 36 is assembled with the right side panel 76 and the left side panel 78 installed on the main structure 74, as illustrated in FIGS. 7 and 8, the right tabs 106 can be inserted in the right slots 110 and the left tabs 108 can be inserted in the left slots 112. In one embodiment, each of the right and left side panels 76, 78 can be formed as a different unitary one-piece construction.

The right and left side panels 76, 78 can be selectively detachable from the main structure 74. When the tray 36 is assembled and installed in the housing 22 of the popcorn machine 20, the right and left side panels 76, 78 can be individually removable from the main structure 74 and thus the interior 26 of the housing 22 to gain access to the area adjacent the main structure 74 and/or to facilitate cleaning of the interior 26 and the tray 36. The tray 36 can accordingly provide a three piece arrangement that is less cumbersome to remove from the housing 26 and is thus easier to clean than a conventional vacuum formed one-piece plastic tray. The main structure 74, the right side panel 76, and the left side panel 78 can each be formed of stainless steel, a thermoformed material (i.e., plastic), or some combination thereof.

The right and left side panels 76, 78 can include right and left handles 114, 116, respectively, that can be grasped by a user to facilitate lifting of the right and left side panels 76, 78, respectively, away from the main structure 74 to facilitate detachment therefrom. The right and left handles 114, 116 can each be selectively retractable between an extended position (as shown in FIG. 6) and a stored position (as shown in FIGS. 7 and 8). When the popcorn machine 20 is in service, the right and left handles 114, 116 can be in the stored position such that the right and left handles 114, 116 rest against the right and left upper walls 90, 92, respectively, and away from the path of popcorn that is dispensed onto the right and left side panels 76, 78. When the right and left side panels 76, 78 are to be detached from the main structure 74, the right and left handles 114, 116 can be slid into the extended position to allow a user to more easily grasp the right and left handles 114, 116 to lift the right and left side panels 76, 78 away from the main structure 74.

In the embodiment shown in FIGS. 6-8, the right and left side panels 76, 78 are shown to simply rest on the floor 80 when the tray 36 is assembled. As such, the right and left side panels 76, 78 can be detached from the main structure 74 by simply lifting the right and left side panels 76, 78 away from the main structure 74 (e.g., with the right and left handles 114, 116, respectively). It is to be appreciated that the right and left side panels 76, 78 being described as detachable can be understood to mean that the right and left side panels 76, 78 can be separated from the main structure 74 and reinstalled thereto without irreversibly damaging or deforming the main structure 74 and without requiring the use of tools, such as a wrench or a screwdriver. It is to be appreciated that, although the right and left side panels 76, 78 are shown to rest on the floor 80, other detachable arrangements are contemplated for the right and left side panels 76, 78. For example, the right and left side panels 76, 78 can be detachably coupled to the main structure 74 via an interference fit such that the right and left side panels 76, 78 can be detached from the main structure 74 by pulling upwardly with enough force to overcome the interference fit. In another example, the right and left side panels 76, 78 can be detachably coupled to the main structure 74 via magnets such that the right and left side panels 76, 78 can be detached from the main structure 74 by pulling upwardly with enough force to overcome the magnetic attraction of the magnets. In yet another example, the right and left side panels 76, 78 can be detachably coupled to the main structure 74 via a slide-lock arrangement (e.g., hooks that extends from the main structure 74 and corresponding slots on the right and left side panels 76, 78 that interface with the hooks). In such an example, the right and left side panels 76, 78 can be slid into and out of position with respect to slide-lock to facilitate selective coupling therebetween. In still yet another example, the right and left side panels 76, 78 can be detachably coupled to the main structure 74 via latches such that the right and left side panels 76, 78 can be detached from the main structure 74 by unlatching the latches.

Referring now to FIG. 3, when the tray 36 is assembled and installed in the housing 22 of the popcorn machine 20, the rear panel 82 can be disposed adjacent to the rear side 30 and the front panel 84 can be disposed adjacent to the front side 28 such that the channel 104 is adjacent to the dispensation opening 42. The floor 80 can be angled upwardly from the rear panel 82 towards the front panel 84 and the dispensation opening 42. The rear panel 82 can be angled with respect to the floor 80 by about 90 degrees. When popcorn is dispensed onto the tray 36, the slope of the floor 80 and the rear panel 82 can urge the popcorn towards the rear panel 82.

Figure 9:
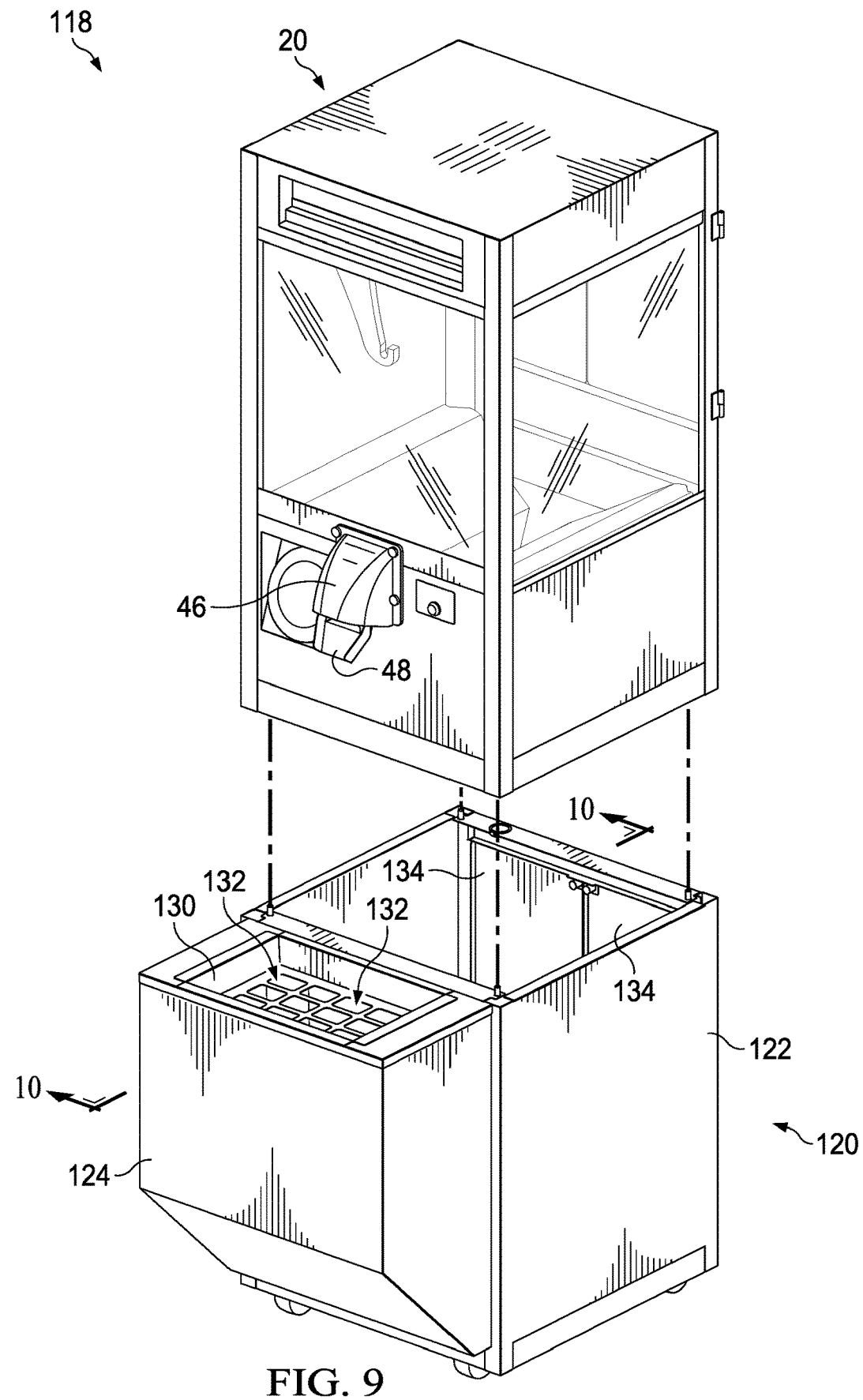
FIG. 9 is a front perspective view depicting the popcorn machine of FIG. 1 in association with a bottom cabinet.

Referring now to FIG. 9, a food dispensing assembly 118 is shown to comprise the popcorn machine 20 and a bottom cabinet 120 that supports the popcorn machine 20. The bottom cabinet 120 can include a main housing 122 and an overflow bin 124 that extends laterally from the main housing 122. The popcorn machine 20 can be installed on top of the main housing 122 and can be coupled thereto with brackets and fasteners (not shown) or any of a variety of suitable alternative attachment arrangements. The legs (e.g., 24 shown in FIGS. 1 and 2) can be removed from the housing 22 to allow the popcorn machine 20 to fit on top of the main housing 122.

The overflow bin 124 can be disposed beneath the hood 46 and the funnel 48 and can be configured to collect any spilled popcorn that is therefrom but is not collected by the consumer. As illustrated in FIG. 10, the overflow bin 124 can define a receptacle 126 that houses a removable container 128 (e.g., a trash can). A cover 130 can overlie the receptacle 126 and can define a plurality of apertures 132 (FIG. 9) that allows any spilled popcorn spilled onto the cover 130 to be collected by the removable container 128. The cover 130 can be selectively removable to allow the removable container 128 to be periodically retrieved from receptacle 126 and emptied. The bottom cabinet 120 can comprise a pair of door 134 that are disposed on an opposite side of the bottom cabinet 120 as the overflow bin 124 and provides selective access to an interior of the bottom cabinet 120.

It is to be appreciated that although a popcorn machine (e.g., 20) is described herein, any of a variety of suitable alternative food dispensing machines for dispensing other ready to eat products beside popcorn, such as, nachos, peanuts, and candy, for example, are contemplated and include the various principles and features disclosed herein.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A food dispensing machine comprising:
   a housing that defines an interior and comprises a front wall that defines a dispensation opening adjacent to the interior;
   a tray disposed in the interior and comprising:
      a main structure comprising a floor;
      a first side panel that extends from the floor; and
      a second side panel that extends from the floor and is spaced from the first side panel such that the floor extends therebetween and cooperates with the first side panel and the second side panel to at least partially define a trough that is disposed adjacent to the dispensation opening;
   an auger disposed in the trough and selectively rotatable about a rotational axis; and
   a motor operably coupled with the auger for powering rotation of the auger, wherein each of the first side panel and the second side panel is selectively detachable from the main structure to facilitate access to an area adjacent to the main structure and beneath the first side panel and the second side panel, respectively.

2. The food dispensing machine of claim 1 wherein each of the first side panel and the second side panel comprises:
a lower wall that interfaces with the floor and cooperates with the floor to define the trough; and
an upper wall that extends from the lower wall and is angled with respect to the lower wall and away from the trough.

3. The food dispensing machine of claim 2 wherein each of the first side panel and the second side panel are each individually formed as a separate unitary one-piece construction.

4. The food dispensing machine of claim 2 wherein:
the floor defines a first slot and a second slot;
the first side panel comprises a first tab that is inserted in the first slot; and
the second side panel comprises a second tab that is inserted in the second slot.

5. The food dispensing machine of claim 2 wherein the tray further comprises a rear panel that extends from each of the floor, the first side panel, and the second side panel at an opposite side of the floor as the dispensation opening.

6. The food dispensing machine of claim 5 wherein the floor is angled upwardly from the rear panel to the dispensation opening.

7. The food dispensing machine of claim 6 wherein the rear panel extends from the floor at about a ninety degree angle.

8. The food dispensing machine of claim 5 wherein the floor and the rear panel are formed together as a one piece construction.

9. The food dispensing machine of claim 5 wherein the floor and the rear panel cooperate to define a slot that accommodates a portion of the auger.

10. The food dispensing machine of claim 1 wherein the floor defines a plurality of apertures.

11. The food dispensing machine of claim 2 wherein:
the first side panel comprises a first handle that is selectively graspable to facilitate detachment of the first side panel from the floor; and
the second side panel comprises a second handle that is selectively graspable to facilitate detachment of the second side panel from the floor.

12. A tray for a food dispensing machine, the tray comprising:
a main structure comprising a floor and a rear panel that extends upwardly from the floor;
a first side panel that extends from the main structure; and
a second side panel that extends from the main structure and is spaced from the first side panel such that the floor and the rear panel extends therebetween, wherein the floor and the rear panel cooperate with the first side panel and the second side panel to at least partially define a trough, wherein each of the first side panel and the second side panel is selectively detachable from the main structure to facilitate access to an area adjacent to the main structure and beneath the first side panel and the second side panel, respectively.

13. The tray of claim 12 wherein each of the first side panel and the second side panel comprises:
a lower wall that interfaces with the floor and cooperates with the floor to at least partially define the trough; and
an upper wall that extends upwardly from the lower wall at a different angle than the lower wall and towards the trough.

14. The tray of claim 13 wherein each of the first side panel and the second side panel are each individually formed as a separate unitary one-piece construction.

15. The tray of claim 12 wherein:
the floor defines a first slot and a second slot;
the first side panel comprises a first tab that is inserted in the first slot; and
the second side panel comprises a second tab that is inserted in the second slot.

16. The tray of claim 12 wherein the rear panel comprises:
a lower wall that interfaces with the floor and cooperates with the floor to at least partially define the trough; and
an upper wall that extends upwardly from the lower wall at a different angle than the lower wall and towards the trough.

17. The tray of claim 16 wherein the floor and the rear panel cooperate to define a slot that accommodates a portion of an auger.

18. The tray of claim 12 wherein the floor defines a plurality of apertures.

19. The tray of claim 12 wherein the main structure further comprises a front panel that extends upwardly from the floor and the front panel is spaced from the rear panel such that the floor extends between the front panel and the rear panel, and wherein the front panel defines a channel adjacent to the trough.

20. The tray of claim 19 wherein the trough is deeper at the rear panel than at the front panel such that the floor slopes upwardly towards the front panel.

* * * * *